Patented Feb. 16, 1954

2,669,448

UNITED STATES PATENT OFFICE 2,669,448

RESILIENT WHEEL MOUNTING

Walton W. Cushman, Webb City, Mo., assignor to the United States of America as represented by the Secretary of the Army Application November 16, 1951, Serial No. 256,807

3 Claims. (Cl. 267—63)

(Granted under Title 35, U. S. Code (1952), sec. 266)

The invention described herein, if patented, may be manufactured and used by or for the Government for governmental purposes, without the payment to me of any royalty thereon.

My invention relates to a resilient mounting for wheels and the like.

A primary object of the invention is to provide a resilient mounting for vehicle wheels, casters and the like and employing rubber balls for resiliently connecting the relatively movable elements of the mounting.

A further object is to provide a resilient wheel mounting which affords substantially universal cushioning of the wheel against shocks.

A further object of the invention is to provide a resilient wheel mounting which is compact and simplified in construction, sturdy and durable, easy to assemble and disassemble and relatively inexpensive to manufacture and maintain.

A still further object is to provide a resilient mounting of the above mentioned character which may have its resiliency varied by increasing or decreasing the number of rubber balls in the assembly, or by changing the durometer reading for the rubber used for making the balls.

Other objects and advantages of the invention will be apparent during the course of the following description.

Figure 1:
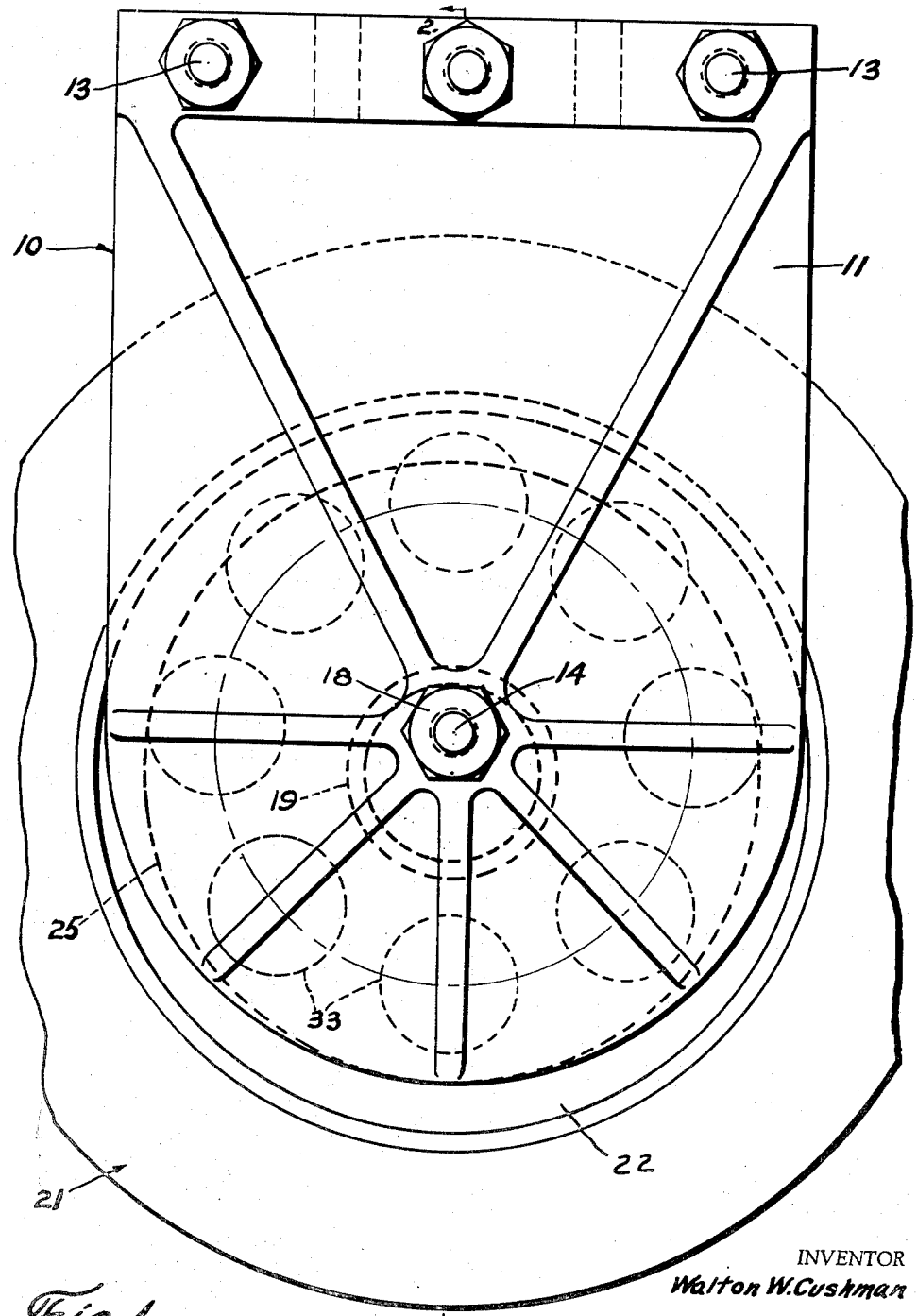
Figure 2:
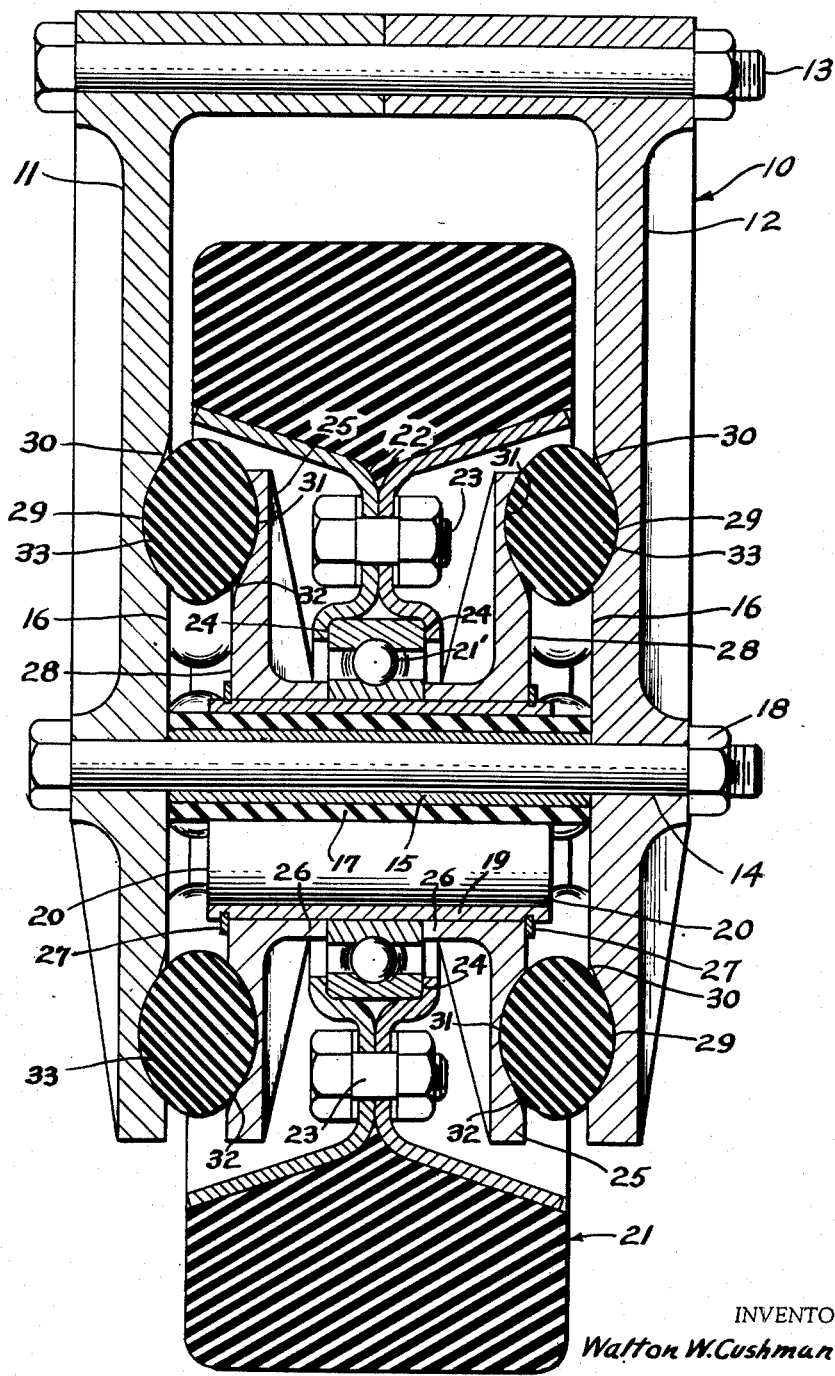

In the accompanying drawings, forming a part of this application, and in which like numerals are employed to designate like parts throughout the same, Figure 1 is a side elevation of a resilient wheel mounting embodying my invention, and Figure 2 is a central vertical section taken on line 2—2 of Figure 1.

In the drawings, where for the purpose of illustration is shown a preferred embodiment of my invention, the numeral 10 designates an inverted U-shaped wheel mounting bracket or support. The mounting bracket 10 includes a pair of companion bracket sections 11 and 12 which may be castings, and the bracket sections are rigidly connected near their upper ends by through bolts 13. The U-shaped mounting bracket 10 may be secured at its top to the swivel bearing of a caster or the like, or the bracket may be connected with any vehicle structure to provide the same with a resilient wheel mounting.

A transverse bolt or axle 14 extends between the bracket sections 11 and 12 near and below their longitudinal centers, and the bolt 14 carries a steel bushing or spacer 15, the ends of which engage the inner flat faces 16 of the bracket sections 11 and 12, as shown. A resilient sleeve 17 of rubber or the like is mounted upon the steel sleeve 15 and is coextensive therewith. Nut 18 is carried by the bolt 14 for rigidly connecting the bolt with the bracket sections and holding the bolt and sleeves 15 and 17 against rotation.

Relatively large cylindrical steel sleeve 19 surrounds the resilient sleeve 17 and has an inside diameter substantially larger than the diameter of the resilient sleeve. The ends 20 of sleeve 19 are spaced from the flat faces 16, as shown. A ball bearing 21' has its inner race pressed onto the large sleeve 19 and the ball bearing is disposed midway between the bracket sections 11 and 12 and at the longitudinal center of the large sleeve 19. A rubber-tired wheel 21 is provided and includes opposed stamped steel discs or sections 22, rigidly secured together in opposed contacting relation by bolts 23, arranged radially outwardly of the ball bearing 21'. Radially inwardly of the bolts 23, the wheel discs 22 are formed to provide opposed cylindrical recesses 24 which receive the outer race of the ball bearing 21', as shown in Figure 2.

A pair of circular bearing or suspension plates 25 are rigidly mounted upon the large sleeve 19, and arranged upon opposite sides of the ball bearing 21'. The bearing plates 25 have hubs 26, contacting the opposite ends of the inner race of the ball bearing 21', as shown. The bearing plates 25 are held against outward axial movement by means of snap rings 27, engaging in annular grooves formed in the sleeve 19 near its ends. The circular bearing plates 25 are arranged in spaced opposed relation to the bracket sections 11 and 12, and have outer flat faces 28, parallel to the flat faces 16.

The bracket sections 11 and 12 are provided in their inner faces 16 with shallow spherically curved recesses or ball seats 29, arranged in circumferentially equidistantly spaced groups, and spaced radially outwardly of the large sleeve 19, as shown. The recesses 29 may be spherical, as shown, conical, or any other shape forming a smooth surface sloping gradually into the flat faces 16. The upper sides of the recesses 29 are preferably provided with gradually sloping channels or passages 30 leading into the main recesses. Companion spherically curved recesses 31 are formed in the outer faces 28 of the bearing plates 25 at points directly opposite the recesses 29. The recesses 31 are disposed near the periphery of the bearing plates 25 and all of the recesses 29 and 31 are located near the bolts 23 in the illustrative arrangement shown in the drawings. The precise radial location of the companion recesses 29 and 31 is not critical, however, and may be varied as desired. The recesses 31 are preferably provided at their lower sides with gradually sloping passages 32 leading upwardly into the same, and arranged diametrically opposite the passages 30.

Deformable resilient spherical balls 33 of rubber or the like are mounted within the companion recesses 29 and 31 and are somewhat compressed and deformed in assembly, as shown. The balls constitute a resilient connection between the wheel 21 and relatively stationary support bracket 10, and the wheel is suspended bodily from the bracket 10 by the resilient balls.

It is to be noted that the large sleeve 19 and bearing plates 25 are eccentric with respect to the bolt 14, when there is no downward load on the assembly. The circular groups of ball recesses 29 and 31 are also somewhat eccentric in the same direction with respect to the plates 25 and bolt 14. The resilient balls 33 hold the wheel 21 in the lowermost position shown in Figure 2, when there is no load on the assembly, and the upper side of the large sleeve 19 then contacts the rubber sleeve 17. The rubber sleeve 17 serves as a resilient bumper and reduces shock, whenever the wheel is displaced so much in any direction, that the sleeve 19 contacts the rubber sleeve.

When a load is placed upon the support bracket 10, the same shifts downwardly, and the bolt 14 assumes a more nearly concentric position within the large sleeve 19. Under load, the rubber sleeve 17 will normally be spaced from the sleeve 19, so that the wheel 21 is substantially floating inside of the bracket 10 and resiliently connected therewith through the balls 33.

As the load on the bracket 10 increases, or as shock loads are imparted to the wheel 21, the balls 33 permit limited universal relative movement of the wheel and support bracket 10. The wheel can move radially in any direction, as well as axially, and it can also tilt or become slightly inclined with respect to the axle 14. All of these movements are possible, since the balls 33 are deformed to the necessary extent to permit limited relative movement, while remaining within the recesses 29 and 31. When the wheel shifts radially within the bracket 10, due to irregularities in the ground, or the like, the rubber balls are subjected to a combined rolling and squeezing or deforming action, since the companion recesses 29 and 31 then shift out of alignment. However, due to the resiliency of the balls 33, when the shock load is removed from the wheel, the wheel will tend to return to its normal unloaded position shown in Figure 2, the recesses 29 and 31 tending to realign themselves. The arrangement is such that when the assembly is carrying the load it is designed to carry, the axle 14 will be substantially centered within the large sleeve 19, and the circular groups of balls 33 will be substantially concentric with the plates 25 and axle 14. The balls 33 provide an effective cushioning of the wheel 21 at all times, and the softness of the cushioning is variable by varying the hardness or durometer reading of the rubber balls, or by increasing or decreasing the number of balls in the assembly. It is to be further noted that the axle 14, large sleeve 19 and bearing plates are all non-rotatable in the assembly. Only the wheel 21 is free to rotate, by virtue of the ball bearing 21'. The bearing plates 25 can however have limited circumferential movement due to the action of the balls 23 previously described.

The resilient wheel mounting is obviously capable of a wide variety of uses, such as in caster constructions, vehicle wheel mountings, etc. It is intended not to restrict the invention to a particular application of the resilient mounting, but merely to illustrate one preferred embodiment.

It is to be understood that the form of the invention herewith shown and described is to be taken as a preferred sample of the same, and that various changes in the shape, size and arrangement of parts may be resorted to, without departing from the spirit of the invention or the scope of the subjoined claims.

I claim:

1. A resilient wheel mounting comprising a relatively stationary supporting member having spaced opposed sides, each side having a group of circumferentially spaced recesses formed therein in opposition to the recesses of the other side, a non-rotatable axle extending between the sides and connecting the sides and arranged centrally of the groups of circumferentially spaced recesses, a relatively large non-rotatable sleeve surrounding the axle between the sides and adapted to shift radially in all directions a substantial distance relative to the axle and having its ends spaced from the sides, a pair of non-rotatable bearing plates carried by the relatively large sleeve in opposed spaced relation to the sides and extending radially beyond the periphery of the sleeve for a substantial distance, each bearing plate having a group of circumferentially spaced recesses formed therein in opposition to the recesses of the sides, a plurality of resilient compressible elements disposed within the recesses of the bearing plates and sides and forming a resilient connection between the bearing plates and sides, a ball bearing mounted upon the sleeve between the non-rotatable bearing plates and engaging the latter to maintain them spaced apart axially upon the sleeve, and a wheel journaled upon the ball bearing for free rotation and disposed between the sides and provided in its opposite sides with recesses receiving the non-rotatable bearing plates and resilient compressible elements, the periphery of the wheel being disposed a substantial distance radially beyond the peripheries of the non-rotatable bearing plates and resilient compressible elements.

2. A resilient wheel mounting comprising a supporting structure including spaced opposed sides, each side having a plurality of circumferentially spaced recesses formed therein in opposition to the recesses of the other side, a non-rotatable axle extending between the opposed sides and connecting the sides and arranged centrally of said circumferentially spaced recesses, a resilient sleeve mounted upon the axle between the sides and adapted to serve as a bumper, a relatively large non-rotatable sleeve surrounding the resilient sleeve and axle between the sides and adapted to shift radially in all directions a substantial distance relative to the resilient sleeve and axle, the ends of the relatively large non-rotatable sleeve being spaced from the sides, a pair of non-rotatable bearing plates mounted upon the relatively large sleeve near the ends of the same and arranged in opposition to said sides, each bearing plate having a plurality of circumferentially spaced recesses formed therein in opposition to the circumferentially spaced recesses of the sides, the circumferentially spaced recesses of the bearing plates and sides being spaced radially beyond the periphery of the relatively large sleeve for a substantial distance, the circumferentially spaced recesses of the bearing plates being arranged eccentrically with respect to said axle so that the relatively large sleeve substantially rests upon the compressible sleeve when the recesses of the bearing plates are axially aligned with the recesses of the sides, a plurality of resilient compressible elements disposed within the recesses of the bearing plates and sides and resiliently connecting the same, a ball bearing mounted upon the sleeve between the bearing plates, and a wheel journaled upon the ball bearing for free rotation between the sides and having its periphery disposed a substantial distance radially beyond the resilient compressible elements, the wheel being provided in its opposite sides with recesses receiving the bearing plates and resilient compressible elements, the resilient compressible elements yielding when a load is placed upon the supporting structure and permitting the axle and resilient sleeve to then shift to a substantially concentric position within the relatively large non-rotatable sleeve in spaced relation thereto.

3. A resilient wheel mounting comprising a relatively stationary supporting member having spaced opposed sides, each side having a group of circumferentially spaced recesses formed therein in opposition to the recesses of the other side, a non-rotatable axle extending between the sides and connecting the sides and arranged centrally of the groups of circumferentially spaced recesses, a relatively large non-rotatable sleeve surrounding the axle between the sides and adapted to shift radially in all directions a substantial distance relative to the axle, a pair of non-rotatable bearing plates carried by the relatively large sleeve in opposed spaced relation to the sides and extending radially beyond the periphery of the sleeve for a substantial distance, each bearing plate having a group of circumferentially spaced recesses formed therein in opposition to the recesses of the sides, a plurality of resilient compressible elements disposed within the recesses of the bearing plates and sides and forming a resilient connection between the bearing plates and sides, a bearing mounted upon the sleeve between the non-rotatable bearing plates and engaging the latter to maintain them spaced apart axially upon the sleeve, and a wheel journaled upon the bearing for free rotation and disposed between the sides and provided in its opposite sides with recesses receiving the non-rotatable bearing plates and resilient compressible elements, the periphery of the wheel being disposed a substantial distance radially beyond the peripheries of the non-rotatable bearing plates and resilient compressible elements.

WALTON W. CUSHMAN.

References Cited in the file of this patent

UNITED STATES PATENTS

| Number | Name | Date |
|---|---|---|
| 581,918 | Pope | May 4, 1897 |
| 1,315,091 | Chipley | Sept. 2, 1919 |
| 1,734,326 | Chesnutt | Nov. 5, 1929 |
| 2,272,270 | Krotz | Feb. 10, 1942 |

FOREIGN PATENTS

| Number | Country | Date |
|---|---|---|
| 613,253 | Great Britain | Nov. 24, 1948 |